United States Patent [19]
Beulens

[11] 4,278,542
[45] Jul. 14, 1981

[54] METHOD FOR MANUFACTURING MULTI-LAYER HEMODIALYZERS AND IMPROVED MULTI-LAYER HEMODIALYZER OBTAINED THEREBY

[75] Inventor: Théophiel Beulens, Heverlee, Belgium

[73] Assignee: Medical Development S.A., Luxembourg, Luxembourg

[21] Appl. No.: 967,895

[22] Filed: Dec. 11, 1978

[51] Int. Cl.³ ............................................. B01D 31/00
[52] U.S. Cl. ............................... 210/321.3; 264/271.1
[58] Field of Search .......... 210/321 A, 321 B, 500 M, 210/456; 264/271, 278, 41, 49, 311; 156/433

[56] References Cited

U.S. PATENT DOCUMENTS

| | | | |
|---|---|---|---|
| 3,339,341 | 9/1967 | Maxwell et al. | 55/16 |
| 3,778,369 | 12/1973 | Markley | 210/321 B |
| 3,834,544 | 9/1974 | Tyson, Jr. et al. | 210/321 B |
| 4,054,527 | 10/1977 | Esmond | 210/321 B |

Primary Examiner—Ivars C. Cintins
Assistant Examiner—E. Rollins Cross
Attorney, Agent, or Firm—Lewis H. Eslinger

[57] ABSTRACT

A method for manufacturing a multi-layered hemodialyzer comprises the step of forming a pack of flattened tubular membranes and supporting members therefor, inserting the pack into a box like open-side enclosure to form a dialyzer assembly while positioning inserts in the open side of the enclosure, sealing the open ends of the membranes and the end spaces between the membranes and the supporting members, removing the inserts from the enclosure to leave communication orifices between the inside of the membranes and the outside of the dialyzer assembly, and securing, to the open sides of the enclosure, closing members defining manifold spaces communicating, through the orifices, with the inside of the membranes. In the formed multi-layered hemodialyzer the manifold spaces have a communication port for communicating with the space defined within the membranes the space of which is substantially equal to the surface area of sealing means being occupied by the communication apertures.

17 Claims, 16 Drawing Figures

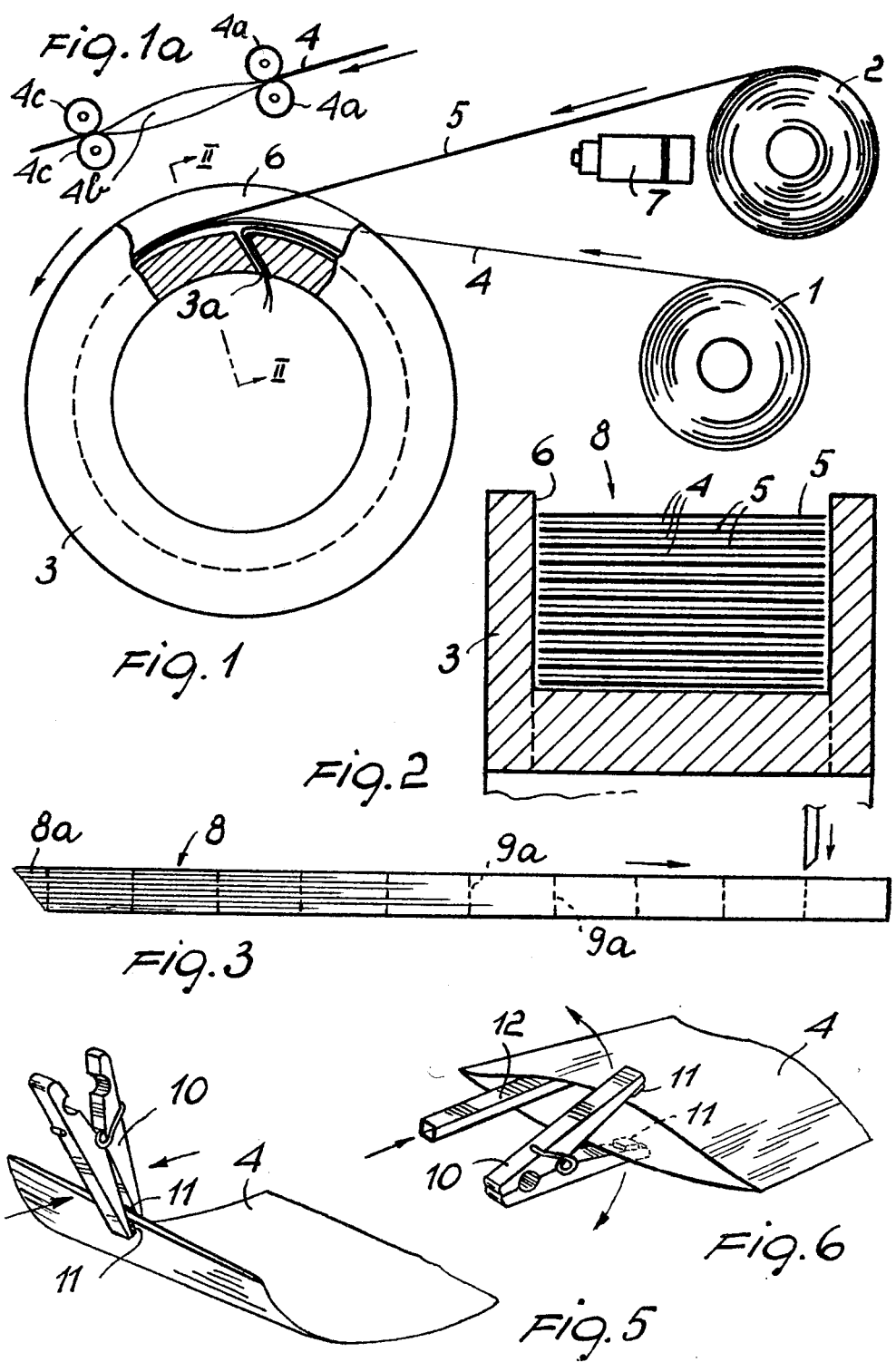

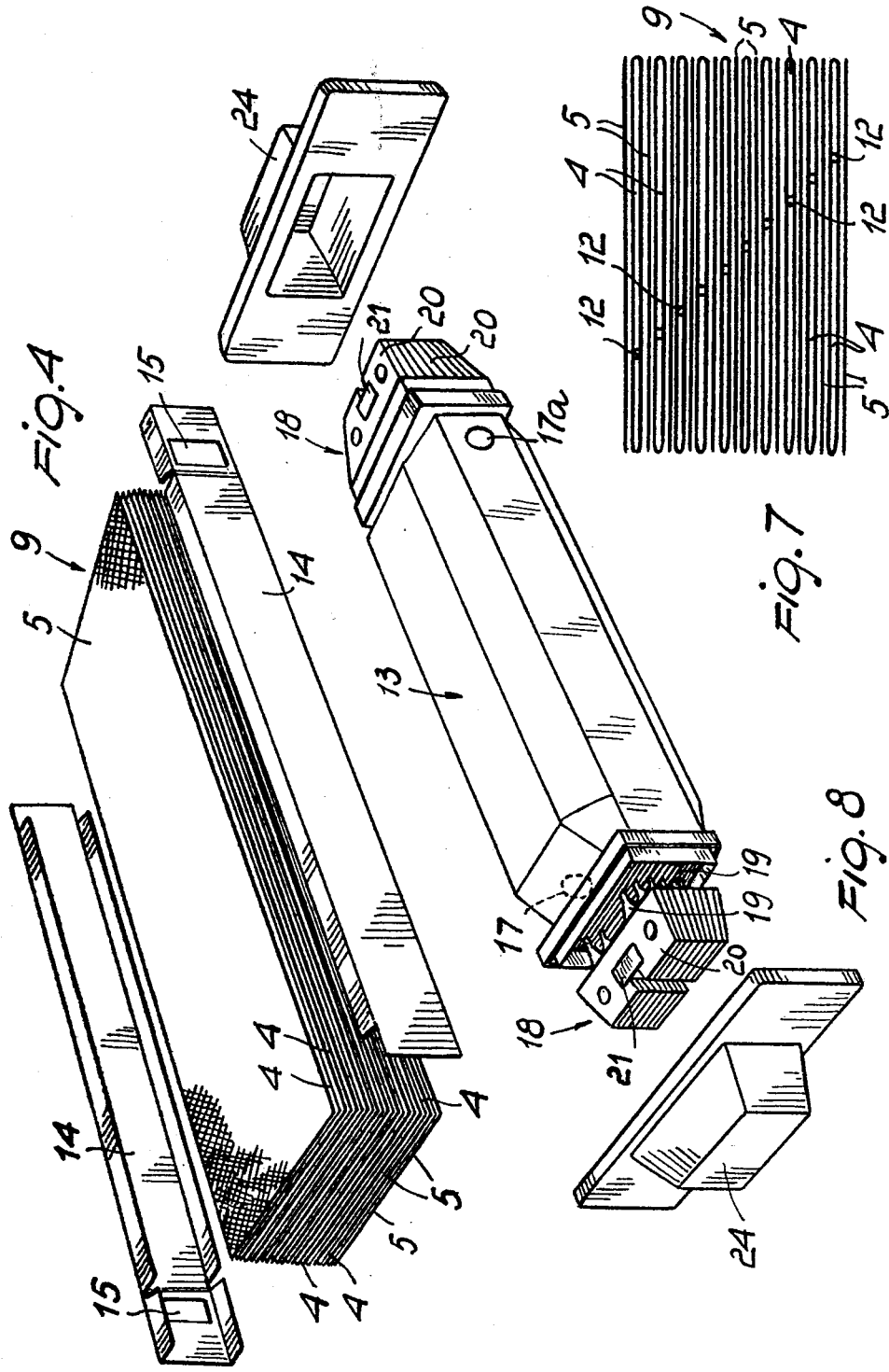

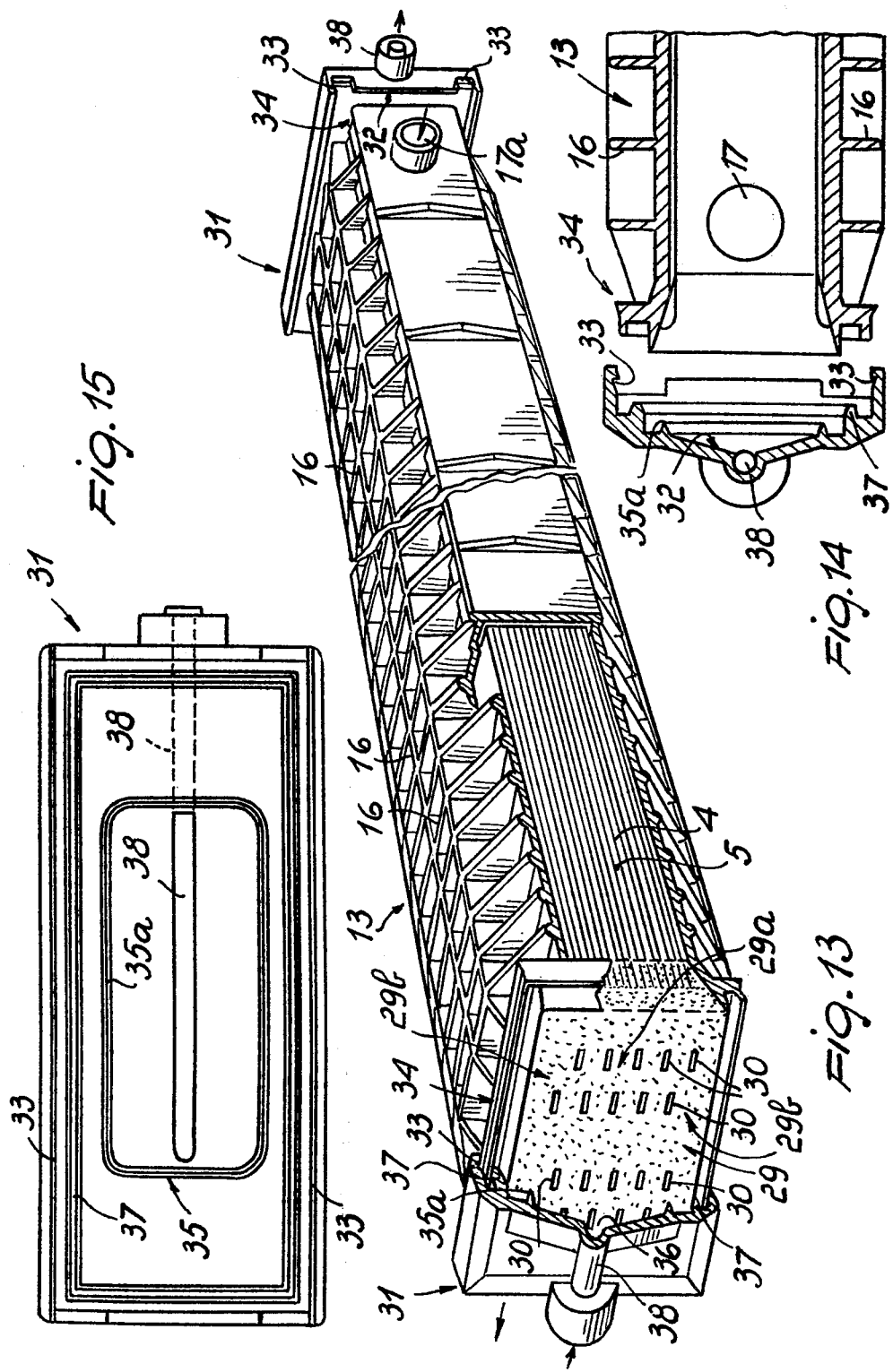

METHOD FOR MANUFACTURING MULTI-LAYER HEMODIALYZERS AND IMPROVED MULTI-LAYER HEMODIALYZER OBTAINED THEREBY

BACKGROUND OF THE INVENTION

This invention relates to a method for manufacturing multi-layer hemodialyzers, which is particularly adapted for mass production techniques. For another of its aspects, the invention also concerns an improved multi-layer hemodialyzer structure.

There are to be found described in the specialized literature multi-layered hemodialyzers which comprise parallel-arranged tubular semi-permeable membranes and supporting members having various surface configurations which are interposed between such membranes. The membranes define interiorly a chamber for blood, or alternatively a dialyzing liquid, to pass therethrough, while the spaces left between the membranes and said supports define a passage area, respectively for the dialyzing liquid or blood. Since the concentration of various impurities in blood is higher than the concentration of those same impurities in the dialyzing liquid, a concentration gradient is created through the semi-permeable membrane which induces, by a dialysis process, transfer of impurities from blood into the dialyzing liquid, to achieve thereby purification of the blood.

Also described are multi-layered hemodialyzers of the type mentioned above, wherein the blood passage area is sealed from the dialyzing liquid passage area by means of a resin layer, in particular epoxy resin, provided around the ends of said tubular membranes so as to leave those ends open and to close the spaces between the open ends of each tubular membrane and the open ends of respective overlying or underlying membranes.

The multi-layer hemodialyzers of the type mentioned above, while being highly effective, never met with widespread commercial acceptance owing to the lack of any suitable mass manufacturing method. Actually, the methods proposed heretofore for producing multi-layer hemodialyzers are very complex, involve several operations requiring the manual intervention of an operator, and thus they are unsuitable for mass production techniques.

In addition thereto, the multi-layer dialyzer designs currently in use have some disadvantages, such as blood purification effectiveness, which is not always entirely satisfactory.

SUMMARY OF THE INVENTION

It is a primary object of this invention to provide a method of manufacturing multi-layer hemodialyzers of the general type mentioned above, wherein the working fluids are subjected to a single pass through the hemodialyzer, which method lends itself to large scale utilization for the mass production of such hemodialyzers.

A further object of the invention is to provide a hemodialyzer manufacturing method suitable for large scale utilization, which is simple, quick, and requires no sophisticated equipment for its implementation, while minimizing stock material waste, thus constituting a method which is convenient from an economics standpoint.

Another object of this invention is to provide an improved multi-layer hemodialyzer structure, which affords full purification of the blood being dialyzed.

These and other objects such as will be apparent hereinafter are achieved by a method of manufacturing multi-layer hemodialyzers having flattened tubular membranes arranged in parallel and separated by foil-like supporting members, characterized in that it comprises the steps of:

(i) forming at least one pack comprising alternate layers of said membranes and said supporting members, wherein the open ends of said membranes are arranged at two opposed sides of said pack;

(ii) forming a dialyzer assembly by inserting said pack into a box-like enclosure, said enclosure being open at its sides whereat said open ends of the membranes are arranged, and positioning in said open ends inserts projecting outwardly from said pack;

(iii) sealing the open ends of said membranes and the end spaces between said membranes and said supports in the dialyzer assembly by: (a) removably closing the open ends of said dialyzer assembly comprising said inserts, (b) placing the inside of said enclosure into communication with at least one container of fluid state resin, and subjecting said dialyzer assembly and said container to a centrifugal force such as to distribute said resin to the ends of said dialyzer assembly containing said inserts, and (c) allowing said resin to set such as to obtain two end blocks as the sealing means;

(iv) removing said inserts from said terminal blocks to leave communication orifices between the inside of said membranes and the outside of said dialyzer assembly;

(v) securing, at the open sides of said enclosure, closing members defining manifold spaces in communication, through said orifices, with said membrane inside.

BRIEF DESCRIPTION OF THE DRAWINGS

Further features and advantages will be more clearly understood from the following detailed description of a preferred, though not exclusive, embodiment of the invention, given herein by way of example only, in conjunction wth the accompanying drawings, where:

FIG. 1 illustrates the winding of alternate layers of tubular membrane and supporting member over a drum;

FIG. 1a shows a variation thereof;

FIG. 2 is a cross-sectional view of the winding drum of FIG. 1, after completion of the winding step;

FIG. 3 shows a stack of alternately arranged tubular membranes and supporting members, as obtained by unwinding from the drum shown in FIG. 1;

FIG. 4 shows a pack of tubular membranes and supporting members, as arranged in alternate layers, and attendant means to allow for pack handling;

FIGS. 5 and 6 illustrate respectively the operations of opening the ends of the tubular membranes and inserting the inserts therein;

FIG. 7 shows the front portion of a pack wherein inserts have already been positioned, according to one embodiment of the invention;

FIG. 8 illustrates the operation of forming the dialyzer assembly according to a further embodiment of the invention;

FIG. 13 is a cutaway perspective view of a hemodialyzer structure according to one embodiment of the invention;

FIG. 14 is a diagrammatical exploded vertical section of an end portion of the hemodialyzer of FIG. 13; and FIG. 15 is a bottom view of a closing member of the hemodialyzer of FIG. 13.

DESCRIPTION OF THE PREFERRED EMBODIMENTS

Figure 9:
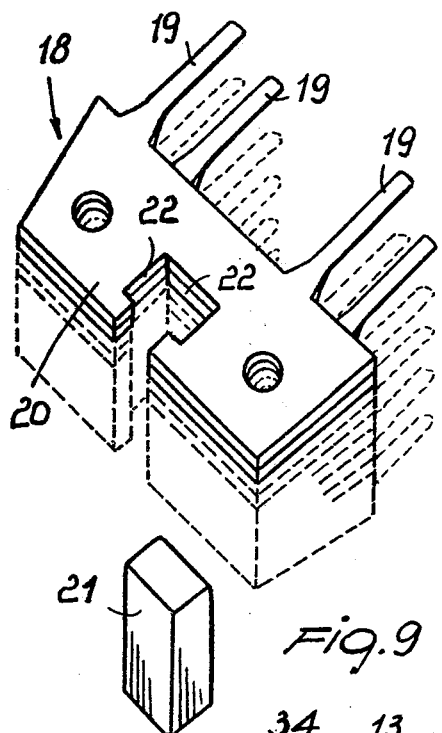
FIG. 9 shows a type of insert suitable for use in this invention.

With reference to the drawing figures listed above, the method of manufacturing single-pass multi-layer hemodialyzers according to this invention comprises preferably the following sequential steps.

The basic material employed is a web of the desired length, in the form of rolls, of a commercially available semi-permeable tubular membrane, preferably of Cuprophane, and of a conventional supporting member suitable for use in manufacturing hemodialyzers, e.g. an embossed foil-like member. These rolls of tubular membrane and foil-like support or backing member, respectively indicated at 1 and 2, are positioned for idle rotation on any suitable stand, and the free ends of the respective materials are inserted through a slot 3a specially provided in a rotary drum 3. After locking, by any conventional means, the ends of the web-like materials in their respective slots, the drum 3 is caused to rotate through a definite number of turns, so that alternate layers of supporting material 5 and tubular membrane 4 are wound in a coil on the drum 3; it is preferred that the top face of the last turn of the coil presents the supporting member 5. Preferably, but not necessarily, a tubular membrane 4 is used having a width dimension substantially equal to that of the foil-like support 5. Advantageously, the drum 3 is so dimensioned that the length of its circumference is approximately equal to the desired length of one hemodialyzer, or an integer multiple thereof. During the winding operation, the rolls 1 and 2 must be suitably tensioned and centered, such as to originate a coil the alternate layers whereof are perfectly aligned. In order to facilitate the alignment and stable positioning of the coil of material 4 and 5 on the drum 3, the latter is provided with a groove 6 extending along the entire circumference of the drum 3 and having a depth dimension suitable to accomodate the desired number of alternate layers.

Upon completion of the winding operation, the ends of the material webs 4 and 5 are cut off any remaining portions on the rolls 1 and 2, and a tubular membrane pre-opening step is advantageously started in the coil thus formed on the drum 3. To this end, a flow of bacteriologically filtered compressed air is blown, by means of an air nozzle schematically indicated at 7, into the outer end or termination of the tubular membrane, air being allowed to flow along the entire width of the coil of layered material. This pre-opening step is effective to considerably facilitate the further tubular membrane opening step, as will be described hereinafter.

According to one modification, air may be blown through the initial end of the tubular membrane, i.e. the end which is inserted through the slot 3a, which air flow through the tubular membrane is first restricted by a pair of rollers 4a, which are suitably closed against each other, and is then trapped in pocket form 4b by the rollers 4c, which are closed against each other upon the air reaching the rollers. This air pocket ensures the desired preliminary opening of the membrane. These details are best seen in FIG. 1a.

The coil thus formed on the drum 3 is unwound therefrom by transferring its free outer end, as resulting from the cutting of the web materials 4 and 5, to a specially provided table (not shown) which is formed with a suitable longitudinal trough having a width dimension equal to the coil width. The unwound coil will thus originate a "loose" stack 8, as shown in FIG. 3, which comprises alternate layers of tubular membrane 4 and supporting or backing material 5, arranged in exact alignment.

The stack 8 can then be suitably compressed, e.g. by means of equipment affording the stack to be pressed along lengths which are equal to the desired hemodialyzer length and the desired height. According to one embodiment of the invention, suitable spaced welds can be made along the aligned longitudinal edges of the stack, such as to convert the same into a unit adapted for shifting and handling as a whole during the subsequent steps. Such side welds 9a are preferably performed at such intervals as to obtain on both longitudinal faces of the stack approximately two welds at any length equal to the desired length of the finished dialyzer. Most suitably, such welds are obtained through a heat sealing process.

The stack 8, either with or without welds, is subjected to a cutting operation to provide a plurality of packs 9 (similar to the one shown in FIG. 4), each having a length equal to the desired dialyzer length, and preferably longitudinally extending packs. Suitable dimensioning of the rotary drum 3, as specified above, enables the overall length of the stack 8 to be an integral multiple of the length of the packs 9, so that the only waste material is the excess portion 8a of the stack resulting from the differential extension of the inner layers with respect to the outer ones formed on the drum 3.

According to one embodiment of the inventive method, each pack 9 thus obtained is first subjected to an end opening operation of the ends of the tubular membranes 4 contained therein.

Preferably, the opening of the ends of the membranes 4 is performed by applying, first to one end and then to the opposite one, clamp means 10 carrying on their clamping surfaces 11 an adhesive material adapted to adhere to the respective flaps of a membrane 4 with a higher force than the mutual adhesion force between the flaps themselves. This opening operation is greatly facilitated by the previously carried out opening step, carried out as mentioned above by blowing air through the membrane coiled around the drum 3.

In the ends of the membranes 4, thus opened, there are positioned inserts 12, preferably inserts of synthetic resin, which according to one embodiment of the invention may be either rod-like or foil-like. The inserts 12 are only partly introduced into the ends of the membranes 4, such as to leave end portions projecting outwardly from such membranes. The inserts 12 may be grouped in the central area of the pack 9, but it is preferred, in order to prevent uneven thickness in the finished dialyzer, to have them offset as shown in FIG. 7.

The pack 9, containing in its end portions the inserts 12, is then inserted into a specially provided box-like enclosure or housing, similar to the one indicated at 13 in FIGS. 8 or 13, which will be described more in detail hereinafter.

According to an alternative embodiment of the method according to this invention, illustrated by way of example in FIG. 8, each pack 9 is first inserted into the box-like enclosure 13, thus forming an assembly termed hereinafter dialyzer assembly, and only thereafter are the ends of the membrane 4 opened and the inserts inserted therein.

To this purpose, starting for example from a "loose" pack, not yet seam welded such as the one shown in FIG. 4, to hole the pack together and allow for its handling, two channel section elements 14 are used, for example secured to the longitudinal sides of the pack 9. The channels 14 are each provided with a hole 15. The pack is then inserted into the box-like enclosure 13.

The box-like enclosure 13 is fabricated from a plastic material, e.g. by a molding process, and has a length which is substantially equal to that of the pack 9. It is provided open at its transversely opposite side faces. On the longitudinal side faces of the enclosure 13, there are provided strengthening ribs which may have various shapes, such as the ribs 16 more clearly visible in FIG. 13, two holes 17 and 17a being further formed in the two opposite side faces, at diametrically opposed positions. The holes 17 and 17a constitute in an interchageable manner the inlet and/or outlet for one of the two fluids involved in the dialysis, and more specifically in this embodiment, for the dialyzing liquid. Thus, the holes 15 will overlap, in the resulting dialyzer assembly, the holes 17, 17a.

The introduction of the inserts into the dialyzer assembly of FIG. 8 is carried out after opening the ends of the tubular membranes 4, as performed for example as explained above with reference to FIGS. 5 and 6. In the alternative embodiment described herein, use is made of inserts of the type shown in FIG. 9 and indicated at 18, comprising each two tabs 19, rigid at one end thereof, with a plate 20, coplanar with the tabs themselves. The tabs 19 are slightly flared out at their bases, which connect the supporting plates 20. The inserts 18 are introduced into each end of the tubular membranes 1, to a depth corresponding to the root or starting point of said flared portion of the tabs. Furthermore, it is preferred that the inserts 18 be positioned alternately offset, i.e. that the tabs of the first, third, fifth, etc. insert be aligned together, whereas the tabs of the second, fourth, sixth, etc. insert, mutually aligned, are offset with respect to the first set of tabs mentioned above. With this arrangement, a relatively uniform thickness is ensured for the pack 9 when the inserts 18 are positioned in the ends of the membranes contained in said pack. The alignment of the inserts 18 is obtained with the aid of guiding means, e.g. the block 21 which engages specially provided seats 22 in the inserts 18.

Figure 10:
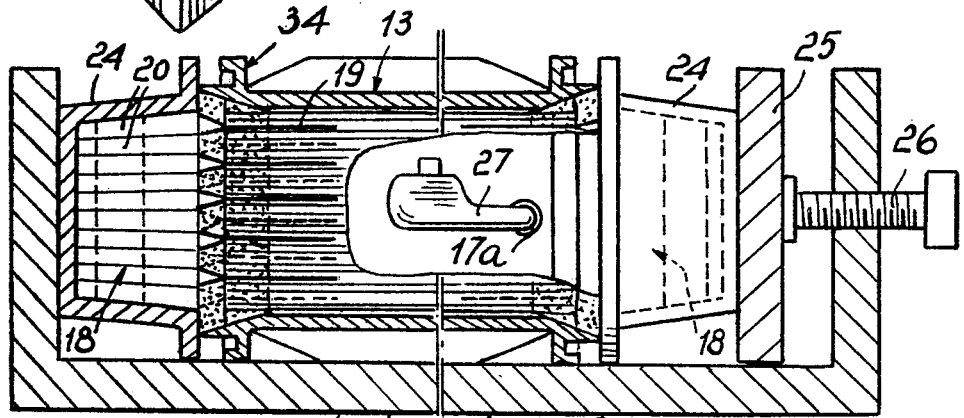
FIG. 10 shows how the dialyzer assembly is prepared for the centrifugating step or operation.
Figure 12:
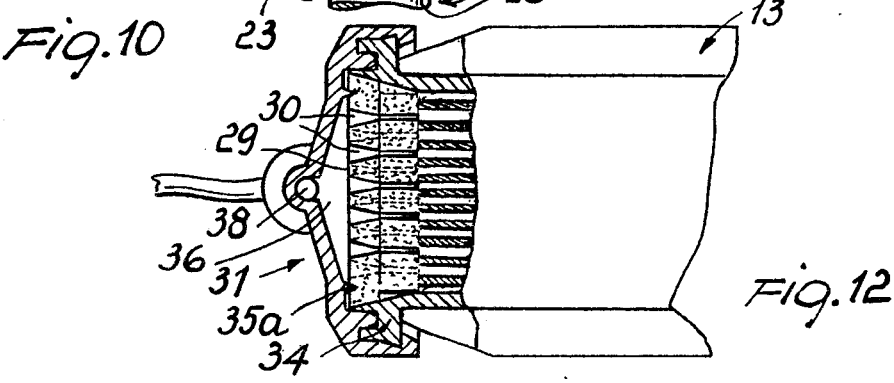
FIG. 12 is a vertical section showing an end portion of the completed hemodialyzer, after the closing members have been secured.

The dialyzer assembly thus prepared, comprising the enclosure 13, pack 9, and the inserts, e.g. either the ones indicated at 18 or, alternatively, at 12, is positioned on the rotary head of a centrifuging machine 23, shown diagrammatically in FIG. 10. To this purpose, said dialyzer assembly is closed at the open ends of the enclosure 13 by means of two caps 24. Such caps may be either reused, when made for example of polyethylene, or be discarded. The caps 24 are clamped onto the enclosure by means of an adjusting screw provided in the centrifuging head 23 and by means of a panel 25 which is biased by means of the adjusting screw 26. In the assembly so prepared for centrifuging, the interior of the enclosure 13 is put in communication with a source of thermosetting resin or of fluid state resin precursor. To this purpose, the holes 17, 17a are connected to outlet ducts of two dispensing containers 27, containing each a thermosetting resin, preferably polyurethane resin, in liquid state. The containers 27 are placed in specially provided housings (not shown) in the centrifuging machine 23 so as to rotate rigidly with said dialyzing assembly.

Upon starting the centrifugating machine, the centrifugal force causes the resin to be distributed within the enclosure 13 to the farthest points from the rotation axis, indicated at 28, so that, due to the "elongated" shape of the packs 9, as mentioned previously, the resin will move to the caps 24 and inner areas of the multilayered pack 9 adjacent to said caps. The fluid state resin will arrange itself between the layers 4 and 5 of the pack in multiple layers 9 around said inserts, where it gradually sets during the rotation of the centrifuging machine. If the centrifuging machine is maintained at ambient temperature, the setting step will be completed in a time period of about 2 hours. In order to speed up the setting process, the temperature may be raised by placing, for example, the rotary head of the centrifugating machine in a thermostatic chamber.

Figure 11:
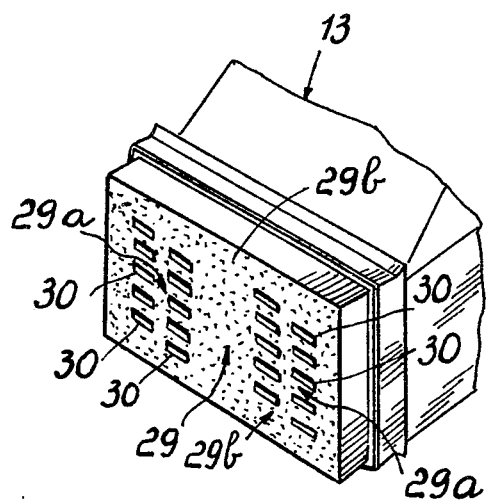
FIG. 11 is a perspective view of the end of the dialyzer assembly of FIGS. 8 and 10 after the inserts have been removed.

On completion of the setting process, the dialyzer assembly, closed by the caps 24, is withdrawn from the centrifugating machine and said caps moved apart to expose, at the ends of the dialyzer assembly thus formed, two blocks of hardened resin. When the inserts 12 are utilized in accordance with the embodiment shown in FIG. 7 the resin blocks have a shape and profile matching the contours of the caps 24. In this case, the blocks are cut, preferably the end edges of the dialyzer assembly, and this operation uncovers the plastic inserts 12 which will be then removed to leave in the remaining portions of the resin blocks orifices, connecting the inside of the tubular membranes to the exterior of the dialyzer assembly. By using inserts of a plastic material that does not adhere to polyurethane resin, the withdrawal of the inserts from the respective ends of the dialyzer assembly is easily and conveniently carried out. By contrast, when the inserts 18 are used, according to the embodiment illustrated in FIG. 9, on completion of the centrifuging step and after removal thereof, the resin blocks 29 appear as shown in FIG. 11, with orifices 30 in communication with the inside of the membranes 4.

It should be noted that in the embodiment utilizing inserts of the type indicated at 18, the orifices 30 are concentrated in a substantially central area 29a of the resin block surfaces, whereas the peripheral areas 29b of the same are solid, having no apertures.

The dialyzer is then completed by attaching to the open sides of the box-like enclosure 13 two respective closing members 31.

A preferred embodiment of the closing members 31 according to this invention will be next described with reference to FIGS. 13-15.

The closing members 31 comprise each an element substantially in the shape of a half box, which defines in the inside thereof a cavity 32 which, in cooperation with the outer surface of the resin blocks 29 facing said cavity, forms dialyzer inlet and outlet chambers to be described hereinafter.

Two of the opposite edges of each closing member 31 are suitably shaped such as to present recesses 33 extending along the entire length of the respective edges, which form a seat for snap engagement with mating projections provided on the box-like enclosure 13 at two opposite edges 34 bordering each said open face of that enclosure.

On the inner surface of the closing members 31, there is provided a rib 35 extending to form a closed polygon to define within said polygon a manifold space 36 proper for the inlet and/or outlet of blood. The span of the spaces 36 substantially corresponds to the area 29a of the resin blocks 29 which is occupied by the orifices 30. The height of the ribs 35 is such that, in the assembled position of the closing members 31, the top edges of the ribs 35, i.e. the edges 35a, are in close contact with the resin blocks 29 and apply a pressure against them such as to form, owing to the pressure exerted and the "yielding" nature of the resins forming the blocks, a recess or depression adapted to accomodate the respective ribs extending peripherally around the area 29a of the blocks 29.

On each closing member 31, moreover, there is provided a projection 37 extending peripherally within the side faces of the closing members 31 and parallel thereto, which projection, in the assembled position of the latter, fits into a mating seat defined in the contoured edges 34 of the enclosure 13. The projections 37 form sealing members for the chambers defined by the cavities 32, contributing to the sealing effect of the ribs 35.

The closing members 31 further comprise ducts 38 opening to the inside of the manifold spaces 36 and serving to supply and/or extract blood to and from the hemodialyzer thus constructed.

With the closing members 31 being of the type preferred by the invention, as described hereinabove, during the securing step thereof to the ends of the hemodialyzer, the members 31 are urged against the open ends of the enclosure 13, thereby the top edges 35a of the ribs 35 will "dig", as mentioned, into their region of contact with the sealing blocks to form a depression. That depression, even though quite shallow, will be effective to ensure stable positioning for the ribs, as well as an effective sealing of the communication area between the manifold spaces 36 and the interior of the membranes 4.

The formation of said depression or recess accomodating the ribs 35 in the sealing blocks 29 is completed, and at the same time made visible, upon the contoured edges comprising the recesses 33 of the closing members 31 snap engaging the matingly contoured edges 34 of the enclosure 13. The multi-layer hemodialyzer according to this invention is thus completed, and the pressure force applied as mentioned to the closing members 31 can be removed.

The resulting hemodialyzer, therefore, is provided with a blood passage area which, in accordance with this invention, is preferably defined within the tubular membranes 4 and may be reached through the orifices 30 connecting said area to the blood inlet and outlet manifold spaces 36, and with a dialyzing fluid passage area defined between each tubular membrane and the respective overlying and underlying supports; this may be reached through the holes 17 and 17a, interchangeable with respect to the inflow and outflow of the dialyzing fluid, formed in the opposite longitudinal sides of the enclosure 13. The necessary contact between the blood and dialyzing fluid, which occurs through the membranes 4, is ensured by suitably dimensioning the dialyzer, by the large contact surface area created by providing a plurality of overlaid membrane 4-support 5 layers, and by the path imparted to the dialyzing fluid, which flows from an inlet hole, e.g. 17a, to an outlet hole 17, located substantially at the maximum distance from the former hole, and through winding passages defined by the configuration of the active surface of the support members 5. Such a configuration is well known in the dialyzer manufacturing field and will not be described in detail herein.

By using closing members 31 having the construction described in the foregoing, which represent the preferred embodiment according to the invention, considerable advantages are afforded.

In fact, owing to the provision of ribs 34 in the closing members 31, the blood is caused to flow exclusively through the manifold spaces 36, thus avoiding diffusion of the blood towards the peripheral areas of the cavities 32 which open to the areas 29b of the sealing resin blocks 29 not provided with apertures 30, where the blood would stagnate and remain cut off the dialysis process. The sealing members 37 prevent any blood leakage to the dialyzer outside, while the contoured edges of the closing members 31 comprising the recesses 33 afford a quick and reliable means of securing them to the box-like enclosure 5.

From the foregoing, it will be apparent that the method according to this invention fully achieves the objects set forth. In fact, it is comparatively simple and economical in that it can be implemented with a minimal outlay in manufacturing equipment and using finished or partly finished materials readily available on the market. The method described affords a minimization of stock material waste during the dialyzer manufacturing process. The method also lends itself to the simultaneous fabrication of a plurality of dialyzers and is accordingly suitable for adaptation to mass production techniques.

I claim:
1. In a method for manufacturing multi-layer hemodialyzers having flattened tubular membranes arranged in parallel and separated by foil-like supporting members, which comprises the steps of
 (i) forming at least one pack comprising alternate layers of said membranes and said supporting members, wherein the open ends of said membranes are arranged at two opposed sides of said pack;
 (ii) inserting said pack into a box-like enclosure to form a dialyzer assembly, said enclosure being open at its sides whereat said open ends of the membrane are arranged; and
 (iii) securing, at the open sides of said enclosure, closing members defining manifold spaces in communication with spaces between said membranes; the improvement which comprises, before step (iii), the steps of:
 (iv) positioning in said open ends of the membranes inserts projecting outwardly from said pack and extending into the interior of the tubular membranes;
 (v) sealing the open ends of said membranes and the end spaces between said membranes and said supporting members in the dialyzer assembly by:
 (a) removably closing the open ends of said dialyzer assembly comprising said inserts,
 (b) placing the inside of said enclosure into communication with at least one container of fluid state resin, and subjecting said dialyzer assembly and said container to a centrifugal force so as to distrib- ute said resin to the ends of said dialyzer assembly containing said inserts, and (c) allowing said resin to set so as to obtain end blocks as means for sealing said open ends and said end spaces, said inserts providing means for defining communications orifices through the set-resin end blocks into the interior of the tubular membranes.

2. A method according to claim 1, wherein the formation of at least one said pack during the step (i) is carried out by winding around a rotary drum alternate layers of said membrane and said support to form a multi-layered coil having a desired length, by then unwinding said coil to form a longitudinally extending stack, and cutting lengths from said stack to produce a plurality of packs having each a length dimension substantially equal to the length of said hemodialyzer.

3. A method according to claim 2, said rotary drum comprises a circumferential depression for accomodating said coil.

4. A method according to claim 1, comprising an additional step of membrane pre-opening carried out subsequently to said winding step around a rotary drum by blowing compressed air into the outer end of said membrane wound into said coil.

5. A method according to claim 1, further comprising providing said box-like enclosure, on the two opposed longitudinal side faces thereof, with two respective orifices for connection to said at least one container for fluid state resin.

6. A method according to claim 1, wherein the step of positioning said inserts into the ends of said membranes in said pack is carried out before said pack of alternate layers is introduced into said box-like enclosure.

7. A method according to claim 6, wherein prior to the positioning of said inserts, a membrane end opening step is carried out using clamp means adapted for adhering to overlaid flaps of said membranes with a higher force than the adhesion force between the flaps themselves.

8. A method according to claim 1, wherein said inserts are either rod-like or foil-like elements.

9. A method according to claim 1, wherein said inserts include rod-like inserts arranged to be mutually offset in the ends of said parallel arranged membranes.

10. A method according to claim 1, wherein said inserts comprise rod-like tabs mounted rigidly at one end thereof to supporting means arranged externally to said membranes.

11. A method according to claim 1, wherein the step of removably closing the ends of said dialyzer assembly is effected by means of two caps removably attachable to the open ends of said enclosure.

12. A method according to claim 1, wherein said closing members are secured to said enclosure by snap engaging shaped portions thereof with matingly shaped portions of said box-like enclosure.

13. A method according to claim 1, wherein said closing members have a half-box shape and are provided at the inside thereof with a sealing and locating rib, said rib being effective to push, during the securing step, on said sealing blocks such as to form therein a corresponding depression acting as a seat for engagement with said ribs.

14. In a multi-layer hemodialyzer structure comprising a plurality of flattened tubular membranes arranged in parallel and foil-like supporting members interposed between said membranes, closing members arranged at the sides of said structure whereat the ends of said membranes are located and which define manifold spaces of inflow to and outflow from the interior of said membranes, and sealing means at the ends of said membranes and said supporting members, said sealing means defining said sides so as to separate from each other the space defined within said membranes and the space defined between said membranes and said supporting members and to allow for communication between the inside of said membranes and said manifold spaces through communication apertures in said sealing means; the improvement in which said communication apertures are all located in an area of the surface of said sealing means substantially smaller than the total surface area of the latter and said manifold spaces have a communication port for communicating with the space defined within said membranes, and said communication port includes delimiting means within the periphery of the sealing means for delimiting the span of said communication port substantially to the surface area of said sealing means that is occupied by said communication apertures.

15. A multi-layer hemodialyzer structure according to claim 14, wherein said delimiting means includes formed on the inner surface closing members with a rib extending to form a closed polygon to border said manifold spaces, said rib being in close contact with said sealing means at the top edge thereof.

16. A multi-layer hemodialyzer structure according to claim 14, wherein said closing members have a half box configuration and shaped edges for snap attachment to said sides of said structure.

17. A method according to claim 1, further comprising, after step (v)(c), removing said inserts from said terminal blocks to leave communication orifices between the inside of said membranes and the outside of said dialyzer assembly.

* * * * *